W. L. MARR.
AUTOMOBILE CONSTRUCTION.
APPLICATION FILED JUNE 21, 1913.
1,113,131.
Patented Oct. 6, 1914.
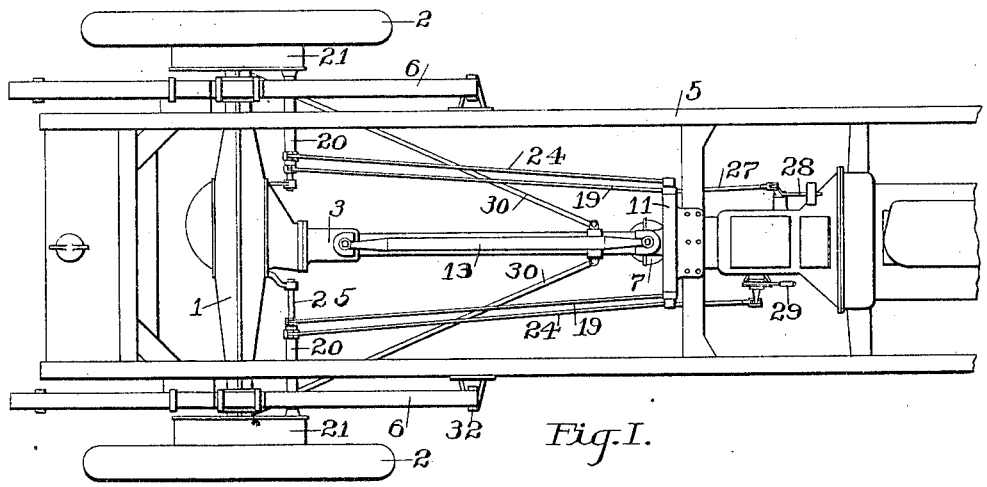
Fig. I.
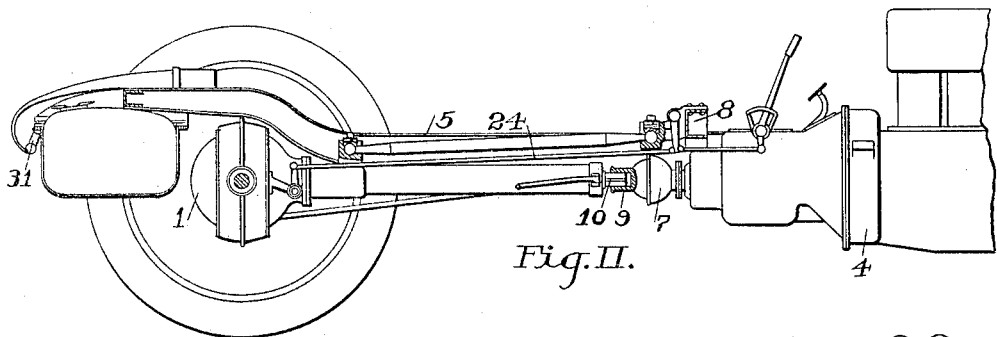
Fig. II.
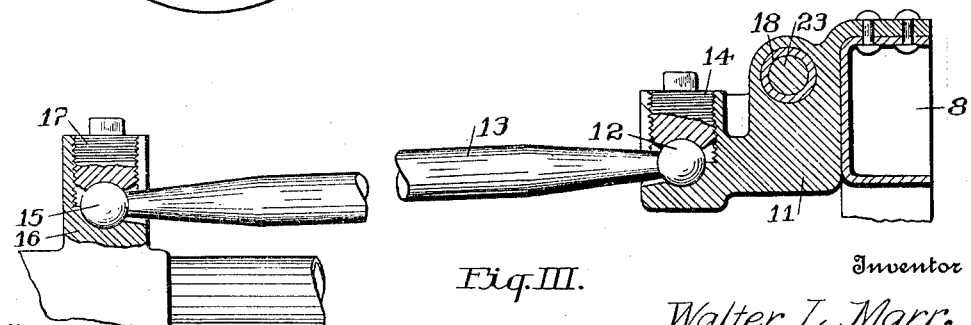
Fig. III.
Witnesses
Anna M. Dorr
J A Noelke
Inventor
Walter L. Marr,
By
Attorneys

UNITED STATES PATENT OFFICE.

WALTER L. MARR, OF FLINT, MICHIGAN.

AUTOMOBILE CONSTRUCTION.

1,113,131.  Specification of Letters Patent.  Patented Oct. 6, 1914.

Application filed June 21, 1913. Serial No. 775,034.

*To all whom it may concern:*

Be it known that I, WALTER L. MARR, a citizen of the United States of America, residing at Flint, in the county of Genesee and State of Michigan, have invented certain new and useful Improvements in Automobile Construction, of which the following is a specification, reference being had therein to the accompanying drawings.

This invention relates to automobile construction and to that part of the driving mechanism whereby the thrust of the traction wheels is communicated through the rear axle to the chassis and to brake and gear controlling means associated with such parts, the object of the invention being to provide freedom of motion between the chassis and the rear axle itself without impairing the efficiency of the drive connections.

Another object of the invention is such disposition of the parts that the members are easily demountable and replaceable without affecting the alinement and the operative relation of the mechanism.

The invention consists in the matters hereinafter set forth and particularly pointed out in the appended claims.

In the drawings, Figure I is a plan view partially broken away of an automobile chassis embodying features of the invention; Fig. II is a view, partially in side elevation and partially in section of the chassis and adjacent portions; and Fig. III is a view in detail of a thrust rod and the thrust bearings thereof.

As herein shown in preferred form a rear drive axle 1 that forms a housing for the usual two-part differential drive shaft and differential gearing is journaled in a pair of traction bearing wheels 2 that are operatively connected to the drive shaft in the usual manner. A hollow torque member 3 that is rigidly secured to the axle 1 extends forwardly toward a power plant 4 which is secured to a chassis frame 5. The latter is mounted yieldingly by suitably disposed springs 6 on the axle 1.

The connection between the power plant and the chassis may be as desired provided a universal joint connection indicated at 7 extends from the rear end of the plant as a continuation of the drive shaft actuated through any preferred change speed mechanism from the motor proper. As herein shown this universal joint is adjacent a transverse member 8 of the chassis. The joint which is in form a ball and socket has a hollow stem 9 extending from the ball member in sliding non-rotatable engagement with a shaft 10 which is housed in a tube 3 and is operatively connected to the differential of the rear axle in the usual manner. A thrust bearing 11 is secured on the transverse member and is provided with a socket at its forward end in which the spherical end 12 of a thrust bar 13 is secured by a cap 14 or plug that is in screwthreaded engagement with the socket. Another ball 15 at the other end of the rod 13 is similarly secured in a socket 16 by a cap 17, the socket being formed on or secured to the torque tube 3 adjacent to the axle 1. The sockets and caps are so disposed as to allow slight oscillatory movement of the thrust rod in its end bearing.

A tubular rock shaft 18 is journaled transversely in the bracket 11 and is connected by links 19 with tubular sleeves 20 mounted on the axle 1 and operatively connected to expansion members (not shown) of brakes that operate on drums indicated at 21 on the traction wheels 2. A rock shaft 23 that is journaled in a shaft 18 is likewise connected by rods 24 or the like with shafts 25 concentric with the shafts 20 and coupled to other internal brake members of the drum 21. Whichever brake intended as a service brake is operatively connected by means shown at 27 with a foot pedal 28 the connections and pedals being mounted on the power unit 4. An emergency brake lever 29 likewise mounted on the power plant, is operatively coupled to the other brake member. Diagonal brace rods 30 complete the rear axle construction while the shackle connections indicated at 31 and 32 between the ends of the spring 6 and the chassis give perfect freedom of movement of the rear axle in relation to the chassis.

One object of the construction is the carrying of the operative parts of the brakes upon the power unit, torque tube and rear axle so that relation between them is maintained regardless of any oscillation of the rear axle in reference to the chassis, the latter having nothing to do but carry the body and receive the thrust of the rear axle at its forward end portion. Another feature is the taking up of all thrust by the thrust rod thereby relieving the torque tube from transmitting any strains, which might tend to cause it to bind upon the shaft that is journaled therein. Furthermore the disposition of the sockets of the thrust rod is such that it may be removed and replaced without difficulty and any slight variation in alinement between the socket does not affect the operation of the rod. The oscillation of the chassis in relation to the axle and the endwise tilting of the latter are not retarded in any way by the driving connection, the load springs only cushioning such movement and not transmitting any end thrust of the axle. The parts are easily accessible for inspection, replacement or repair and relieve the chassis of all but the necessary driving strain so that it may be made comparatively slight.

Obviously, changes in the details of construction may be made without departing from the spirit of my invention and I do not care to limit myself to any particular form or arrangement of parts.

What I claim is:—

1. The combination in an automobile, of a rear drive axle, a chassis yieldingly supported thereon, a power plant mounted on the chassis, a longitudinally disposed drive shaft having universal and extensible joint connection with the power plant and operative connection with the rear drive axle, and a thrust rod arranged above and substantially parallel to the drive shaft having universal thrust joint connections at its ends with the rear drive axle and with the chassis adjacent the power plant.

2. The combination in an automobile, of a rear drive axle, a chassis yieldingly supported thereon, a power plant mounted on the chassis, a longitudinally disposed drive shaft having universal and extensible joint connection with the power plant and operative connection with the rear drive axle, a thrust rod above and substantially parallel to the drive shaft having universal thrust joint connections at its ends with the rear drive axle and with the chassis adjacent the power plant, and brake controlling and speed changing means mounted on the rear axle and power plant.

3. The combination in an automobile, of a rear drive axle having a forwardly extending torque member, a socket thereon, a chassis yieldingly supported on the drive axle, a socket thereon, and a thrust member directly above said torque member and detachably secured at its ends in the sockets, the sockets permitting angular movement of the member therein.

4. The combination in an automobile, of a rear drive axle, a torque member extending forwardly therefrom, a chassis yieldingly mounted on the axle, a transverse member secured on the chassis in advance of the axle, a socket secured on the thrust member adjacent the axle, a socket secured on the transverse member of the chassis, and a thrust member directly above said torque member and pivotally secured at its ends in the sockets.

5. The combination in an automobile, of a rear drive axle, a hollow torque member rigidly secured thereto, a chassis yieldingly mounted on the axle, a power plant secured on the chassis, a drive shaft extending from the plant through the hollow torque member and having a universal telescoping joint connection between the plant and the torque member, and a thrust member arranged directly above said torque member and having universal thrust joint connections at its ends with the torque member adjacent the axle and with the chassis adjacent the universal joint.

6. The combination in an automobile, of a rear drive axle, a hollow torque member rigidly secured thereto, a chassis yieldingly mounted on the axle, a power plant secured on the chassis, a drive shaft extending from the plant through the hollow torque member and having a universal telescoping joint connection between the plant and the torque member, a socket secured to the rear axle, a socket secured to the chassis adjacent the universal joint, and a thrust member above said torque member and pivotally secured at its ends in the sockets.

7. The combination in an automobile, of a rear drive axle, a hollow torque member rigidly secured thereto, a chassis yieldingly mounted on the axle, a power plant secured on the chassis, a drive shaft extending from the plant through the hollow torque member and having a universal telescoping joint connection between the plant and the torque member, brake mechanism mounted on the rear axle, brake controlling means mounted on the power plant, and connected to the brake mechanism, and rigid means directly above said torque member for connecting said torque member and said chassis.

8. In a chassis, a rear drive axle, a hollow torque member extending forwardly therefrom, a chassis yieldingly supported on the axle, a power plant secured on the chassis, a longitudinal shaft extending to the power plant through the torque tube and having a universal sliding joint connection lying between the torque member and the power plant, a socket on the torque member adjacent the shaft having a ball seat, a removable ball retaining cap, a socket secured on the chassis adjacent the universal joint having a ball seat, and a removable ball retaining cap, and a thrust member above said torque member and having ball end portions adapted to be secured in the sockets by the caps.

9. In an automobile, a rear drive axle, a torque member extending forwardly therefrom, a chassis yieldingly mounted on the axle, a power plant secured on the chassis, a shaft extending through the torque member to the power plant and having a universal sliding joint connection interposed between the power plant and the forward end of the torque member, and a thrust member having a ball and socket thrust connection with the torque tube adjacent the rear axle and with the chassis adjacent the universal joint of the driving shaft and disposed directly above said torque member, the thrust member being adapted to be lifted bodily from the socket connections transversely to the line of thrust.

10. In an automobile, a rear drive axle, traction bearing wheels journaled thereon, brakes for the wheels, mechanism for setting the brakes mounted on the rear axle, a torque member extending forwardly from the rear axle, a transmission shaft extending through the torque member, a chassis yieldingly supported on the axle, a power plant mounted on the chassis, a universal sliding joint connection in the shaft interposed between the power plant and the torque member, a thrust bearing member secured on the chassis, rock shafts mounted on the thrust bearing member, links operatively connecting the rock shafts with the brake mechanism on the axle, brake controlling means on the power plant operatively connected to the thrust bearing member rock shaft, and a thrust member pivotally connected at its end portions to the rear axle and to the thrust bearing member respectively.

11. In an automobile, a rear drive axle, a chassis yieldingly mounted thereon, a transverse member on the chassis, a torque member extending forwardly from the axle, a thrust bearing member secured on the transverse member of the chassis, a thrust bearing member secured on said torque member, a thrust member above said torque member and substantially parallel thereto and having spherical ends adapted to rest in the bearing members and detachable caps coöperating with the sockets as thrust bearings for the end portions of the thrust member whereby the thrust member may be lifted bodily from the bearing members when the caps are removed.

12. In an automobile, a rear drive axle, a chassis yieldingly mounted thereon, a transverse member on the chassis, a torque member extending forwardly from the axle, a thrust bearing member secured on the transverse member of the chassis, sockets on the torque and thrust bearing members, a thrust member arranged above and substantially parallel to said torque member and having spherical ends adapted to rest in the sockets, detachable caps coöperating with the sockets as thrust bearings for the end portions of the thrust member whereby the thrust member may be lifted bodily from the sockets when the caps are removed, a power plant mounted on the chassis, and a shaft extending from the power plant into and through the torque member and having a universal sliding joint connection between the power plant and the torque member.

13. In an automobile, a rear drive axle, traction bearing wheels journaled thereon, a two part differential drive shaft for the wheels, a hollow torque member extending forwardly from the rear drive axle, a chassis yieldingly mounted on the axle, a power plant secured on the chassis, a shaft extending from the power plant to the rear axle through the hollow torque member, that is operatively connected to the differential drive shaft, a universal sliding joint connection in the shaft between the power plant and the torque member, brake mechanism on the traction wheels and rear axle, rock shafts for operating the brake members mounted on the drive axle, a thrust bearing member secured to the chassis adjacent the universal joint connection of the torque member shaft, rock shafts journaled in the thrust bearing member, links articulating the thrust bearing member rock shafts with the drive axle rock shafts, brake-operating pedals mounted on the power plant and operatively connected to the thrust bearing member rock shafts, and a thrust member detachably secured by ball and socket connections at the ends thereof with the rear drive axle and with the chassis thrust bearing member whereby it may be removed bodily from the chassis independently of the brake mechanism and torque tube and drive shaft mechanism.

In testimony whereof I affix my signature in presence of two witnesses.

WALTER L. MARR.

Witnesses:
 MILTON POLLOCK.
 W. L. NELSON.